United States Patent [19]
Compton et al.

[11] 3,791,868
[45] Feb. 12, 1974

[54] METHOD OF MAKING A BATTERY CELL HAVING A COILED METALLIC FOIL CATHODE MEMBER

[75] Inventors: Charles E. Compton, Martinez; William H. Taplin, III, Lafayette, both of Calif.

[73] Assignee: The Dow Chemical Company, Midland, Mich.

[22] Filed: May 12, 1972

[21] Appl. No.: 252,624

Related U.S. Application Data

[63] Continuation-in-part of Ser. No. 70,146, Sept. 8, 1970, abandoned.

[52] U.S. Cl. .................. 136/13, 29/472.1, 29/475
[51] Int. Cl. ............................................. H01m 35/16
[58] Field of Search..... 136/13, 14, 6, 83, 134, 135; 219/62; 29/476.5, 472.1, 475

[56] References Cited
UNITED STATES PATENTS

| | | | |
|---|---|---|---|
| 3,393,095 | 7/1968 | Philipp | 136/14 |
| 3,476,602 | 11/1969 | Brown et al. | 136/6 FS |
| 2,433,966 | 1/1948 | Van Keuren | 219/62 |
| 3,621,178 | 11/1971 | Nakayama et al. | 219/62 X |
| 2,726,463 | 4/1973 | Hoffman et al. | 219/62 X |

*Primary Examiner*—A. B. Curtis
*Assistant Examiner*—C. F. LeFevour
*Attorney, Agent, or Firm*—William M. Yates

[57] ABSTRACT

The invention is an improved process for making a battery cell having as an electrode a metallic sheet wound into a vertical coil of spaced apart layers. The use of a thin metallic foil as such an electrode is made feasible by:

1. disposing a metallic spacer strip between the foil layers adjacent to their lower edges
2. radially compressing the spacer strip and the foil into close contact, and
3. forming at least one common electrical connection between the spacer strip and foil edges by heli-arcing a weld bead on the bottom of the assembly.

9 Claims, 4 Drawing Figures

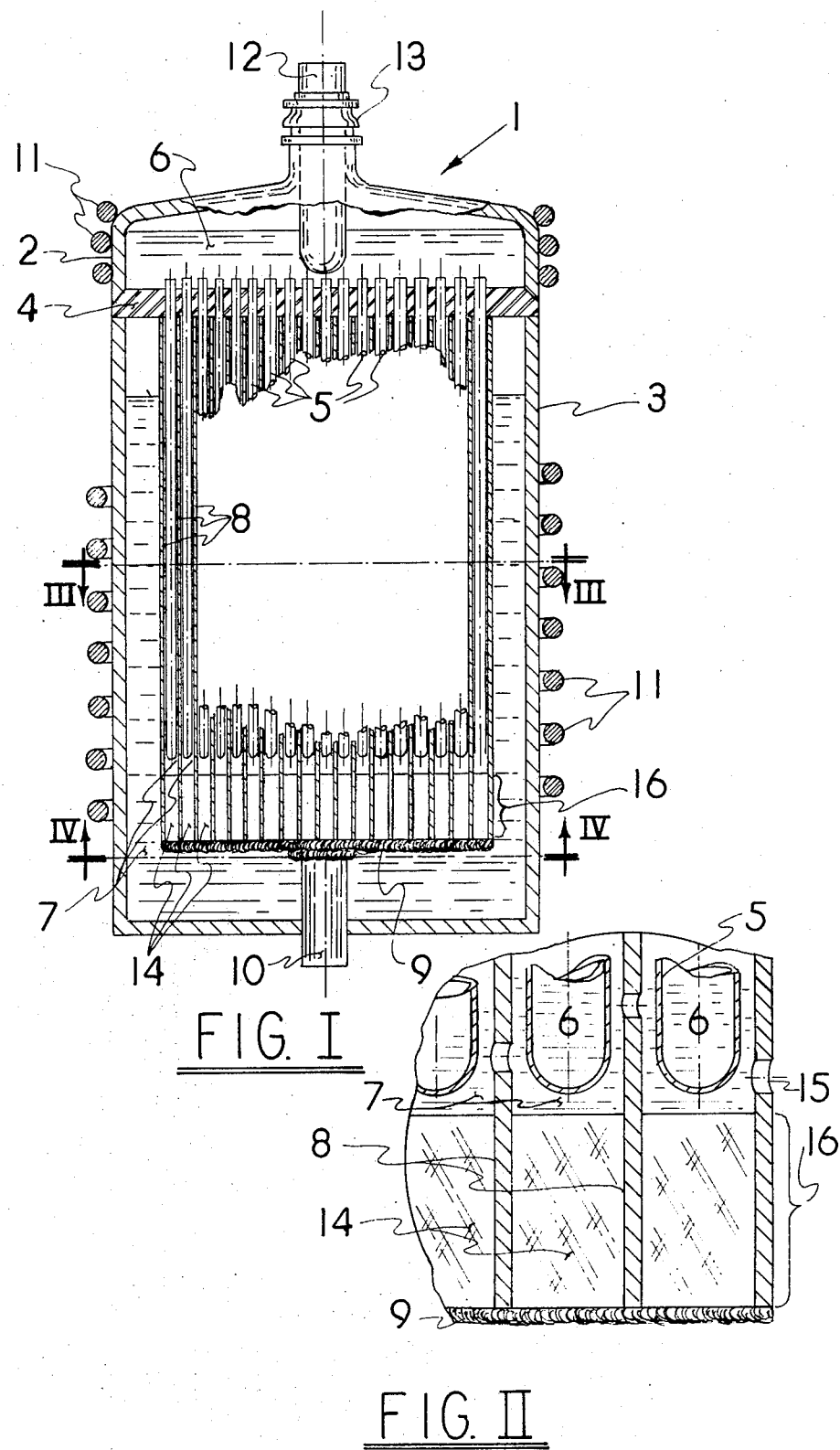
FIG. I
FIG. II

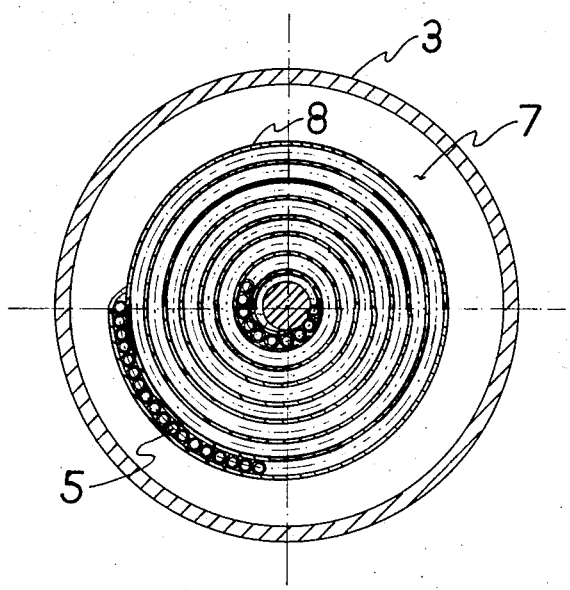
FIG. III
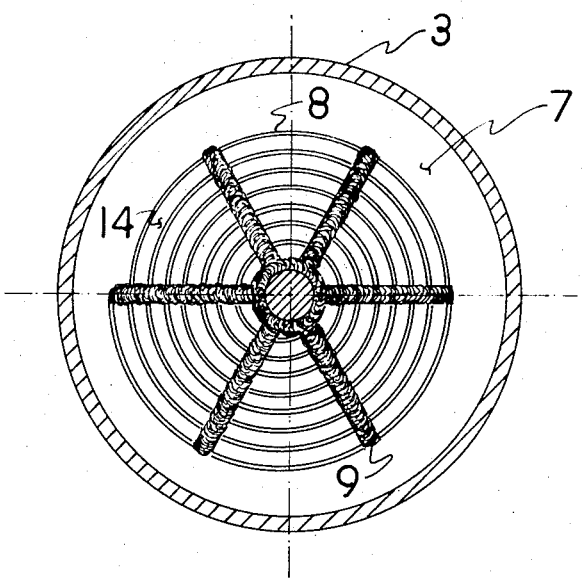
FIG. IV

METHOD OF MAKING A BATTERY CELL HAVING A COILED METALLIC FOIL CATHODE MEMBER

CROSS-REFERENCE TO RELATED APPLICATION

The present application is a continuation-in-part of our previous application Ser. No. 70,146, filed Sept. 8, 1970, entitled "BATTERY CELL" now abandoned.

BACKGROUND OF THE INVENTION

Coiled battery elements are well known (see, for example, U.S. Pat. No. 3,393,095). In order to provide direct electrical communication between different portions of such elements and an external terminal, the use of tabs, edge crimping and/or welding, have been resorted to.

Battery cells employing a molten alkali metal as a consumable anode/anolyte and sulfur (in an alkali metal polysulfide melt) as a consumable cathode/catholyte have recently been developed (see U.S. Pat. No. 3,404,035). In certain varieties of the latter type of cell, it would be highly advantageous to be able to use coiled metallic foils as cathodic electrodes.

In such cells, the anolyte and catholyte are separated by a cation conductive electrolyte/membrane. In a particularly desirable design (see U.S. Pat. No. 3,476,602), this electrolyte takes the form of a large number of closely spaced, capillary glass tubules, or fibers, filled with the molten alkali metal. The high anode area per unit cell volume and the thinness of the electrolyte/membrane thus provided make for a low internal resistance. However, in order to minimize internal resistance and achieve a maximum power output per unit volume of cell, it is necessary that the fiber lengths be spaced as closely as possible to each other and to cathodic current collector elements having a minimal electrical resistance. The use of thin metallic sheets disposed between successive rows of fibers is then indicated. If the thin sheets are disposed as successive wraps of a single, elongate foil wound into a generally cylindrical coil, the fibers being laid side by side across the foil before it is rolled up, the process of cell construction is simplified.

The tubules are disposed on the foil so that their open ends will protrude above the completed coil and a ribbon of a suitable cement is deposited on the protruding portions. When the assembly is rolled up and the cement cured, there results a "tube sheet." A body of molten alkali metal, communicating with the open ends of the fibers, is disposed in a reservoir above the tube sheet. The portions of the fibers below the tube sheet are immersed in a molten polysulfide of the alkali metal, disposed between the successive layers of foil.

The preceding "jelly-roll" design should be particularly amenable to mass production manufacturing techniques. However, the known methods of joining the edges of coiled battery elements together are not workable. Thin foils cannot be welded and it has not been found possible to maintain sufficient compressive pressure to prevent penetration of the molten catholyte between adjacent foil and/or bottom plate surfaces. Thus, a good electrical connection of the foil wraps to an external terminal has not been found feasible by conventional means.

SUMMARY DESCRIPTION OF THE INVENTION

The invention is a process for making an alkali metal-sulfur battery cell having as the cathodic current collector a thin, elongate metallic foil spirally wrapped into a vertical, cylindrical coil of generally concentric layer. A plurality of hollow electrolyte fibers are vertically disposed between the layers of foil. The upper ends of the fibers are open and protrude above the coil. The lower ends of the fibers are closed and the fibers are of a length such that a lower portion of the foil extends below the fibers as a convolute skirt. A narrow strip of foil is longitudinally disposed between successive wraps of the skirt. The skirt and foil strip are radially compressed into close contact and are joined at their lower edges by at least one heli-arc weld bead formed on the bottom of the coil. Connection between the bead(s) and an external cathodic terminal (a central metallic hub, for example) is made by conventional means, such as welding.

DETAILED DESCRIPTION OF THE INVENTION

Structure

To facilitate understanding of the invention described above, FIGS. I–IV will now be described. In FIG. I, the battery cell (indicated generally by reference number 1) is seen in vertical section and comprises a generally cylindrical anolyte reservoir 2 and a generally cylindrical catholyte container 3, both of which are abutted against and joined in sealing arrangement to an intervening, electrically non-conducting "tube sheet" disc 4. A large number of fine hollow glass fiber lengths 5 (a few of which are shown on a greatly exaggerated scale) having their lower ends closed and their upper ends open pass through the tube sheet in sealing arrangement therewith. The open ends of the fibers communicate with the molten alkali metal 6 in the anolyte reservoir 2 and the portions of the fibers below the tube sheet are immersed in a corresponding alkali metal polysulfide melt 7 held in the catholyte container 3. The fiber lengths are disposed generally parallel to each other in a continuous spiral of generally concentric vertical rows and constitute a generally cylindrical bundle. Disposed between the rows of fiber lengths within the bundle and wrapped around the bundle at least once is a cathode member 8. The latter consists of a thin, flexible elongated sheet of a metal or metal alloy, such as aluminum, and preferably is coated with at least enough graphite or molybdenum disulfide to prevent formation of a surface layer exhibiting a surface resistance in excess of five ohms/cm$^2$ after the battery has been in operation for six months or more. The elongated sheet is wider than the fibers are long and extends vertically from just below the tube sheet to below the closed ends of the fibers.

Highly preferred as cathode elements in the batteries of the present invention are perforate or imperforate foils, from 0.4 to 1.0 mils thick, made of commercially available aluminum or aluminum/magnesium alloys and coated with a layer of powdered graphite or molybdenum disulfide from 100 to 1,000 A thick. Such foils have sufficiently low internal (and surface) resistances to accommodate temporary overload currents but are not so thick as to waste space or add unnecessary weight.

Co-pending application, Ser. No. 202,649, filed Nov. 26, 1971, in the names of W. H. Taplin, R. O. Lindblom and T. L. Caskey, entitled CARBON COATED METALLIC ELECTRODE, discloses in detail how suitable graphite coatings are applied. Co-pending application, Ser. No. 244,410, filed Apr. 17, 1972, in the names of R. R. Stringham and W. H. Taplin, entitled ALKALI METAL/SULFUR BATTERY HAVING A CATHODIC CURRENT COLLECTOR COATED WITH MOLYBDENUM DISULFIDE, discloses how suitable molybdenum disulfide coatings are applied.

A spacer tape 14 is emplaced between the dependent wraps of foil 8 filling the spaces below the closed fiber ends. This tape has a thickness at least equal to a fiber diameter (outer) and up to five diameters or more, depending on the relative amount of catholyte to be used. The tape most conveniently is a thicker strip of the same material from which the cathode mamber 8 is made. However, it will generally be uncoated. Optionally, the tape may be of any flexible, electrically conductive metallic composition which does not melt at the battery operation temperature, is resistant to corrosion by the catholyte and can be heli-arc welded to the cathode foil.

The structure of FIGS. I–IV can also be arrived at by using two spacer strips, on opposite sides of the foil, in a sandwich-like arrangement. In this embodiment, each strip contributes part of the final thickness of the spacer body 14 between adjacent foil wraps. The thickness of one strip is then at least half of a fiber diameter, e.g., the fiber diameter is not more than twice the thickness of one strip.

The tape 14 and the foil 8 are radially compressed, as by winding under tension, and one or more lengths of weld bead 9 are heli-arced on the bottom of the assembly, as shown in FIGS. I and II.

The weld beads 9 do not have to be radially positioned, as shown in FIG. IV. They can be disposed in any geometric pattern which provides adequate electrical contact between the lower edges of the foil (cathode member 8) and spacer tape 14.

In FIG. I there is shown an external cathodic terminal post 10 projecting through the bottom of the catholyte reservoir 3 and weld connected, as shown in FIG. IV, to each of the beads 9. Other terminal locations and connecting arrangements can be employed and will be apparent to those skilled in the art.

The cathodic terminal post 10 can be a hub portion of a metallic core or mandrel (not shown) about which the jelly-roll of fibers and foil is wrapped up prior to potting the fibers in the tube-sheet material. In the embodiment shown in FIGS. I–IV, the mandrel has been removed and the terminal post is a separate member.

FIG. III shows an end-on view looking down on the "jelly-roll" arrangement of the fibers 5 and cathode member 8 at section III—III OF FIG. I. In FIG. III, the close spacing of the fibers actually used is shown only in a portion of the outermost layer.

Returning to FIG. I, the battery cell is provided with external electrical resistance heaters, 11, and with an anode terminal post 12 which passes in sealing arrangement through a neck 13 into the alkali metal 6 in the anolyte reservoir 2.

In actual use, the battery cell is surrounded by insulation and placed in an external casing made of steel or other suitable material.

Procedure of Assembly

Batteries of the invention are constructed in a process involving a number of steps. A plurality of the hollow electrolyte fibers are closely spaced upon an elongated generally rectangular sheet of electrically and thermally conductive material, such as a foil. The sheet has first and second elongated edges. The fibers are positioned generally parallel to one another and transversely to the elongated axis of the sheet. In positioning the fibers, the open ended portions are allowed to extend to a uniform degree beyond the first elongated edge of the sheet thereby to provide a margin. The opposite or closed ends of the fibers may be allowed to uniformly approach the second elongated edge of the sheet with the sheet extending beyond the closed ends of the fibers to form a skirt (16: FIG. II). A very small amount of a readily decomposed or catholyte-compatible adhesive may be used to maintain the fibers in their respective places after they have been positioned.

Once the fibers are positioned, a band of a potting compound (of a solid or paste-like consistency) is applied to the fibers between the open ends thereof and the first elongated edge of the sheet, i.e., the potting compound is applied along the open-ended portions of the fibers forming the margin.

A strip of suitable material, as specified earlier herein, is positioned adjacent to the second elongated edge of the sheet to function as a conductive spacing tape having about the same width as the skirt. This strip can be applied before, during or after emplacement of the fibers on the sheet.

The assembly of the sheet, fibers, spacing tape and potting material is then rolled up, preferably about a mandrel or core. The core may be electrically conducting, in which case a lower protruding end can conveniently serve as an external terminal; or, it may be non-conducting. It can be left in the final "jelly-roll" or removed.

As the roll is wound up, the band of potting compound forms a continuous layer adjacent to the open ended portions of the fibers. The continuity of the layer of potting compound is ensured by applying the band in a thickness corresponding to the thickness of the spacer tape. The final step in forming the potting compound into a fluid-impermeable tube-sheet in sealing engagement with all the fibers is to cause a change to occur within the potting compound to produce a unibodied structure. This can be accomplished, for example, by chemically and/or thermally "curing" the compound. As it is generally desirable to encase the sheet-fiber assembly in one or more container or reservoir members which are in sealing engagement with the tube sheet, it may be desirable to postpone setting of the potting material until the container members have been contacted with it. If the materials forming the container members and potting compound have been properly selected, the potting compound will form a sealing engagement with the container members during the setting process. Optionally, an adhesive can be used to bind the container members to the tube sheet after it has been formed.

At some stage of assembly while the bottom of the rolled-up assembly is still accessible, one or more weld beads are formed thereon by fusing successive sheet and spacer tape layer edge portions together with a helium shielded electric arc.

Before or after the tube sheet has been solidified, it is fitted with container means for the catholyte and sheet-fiber assembly and with a reservoir for the anode material which is to be positioned in contact with the open ends of the fibers.

The cathode material may be introduced into the cell in several ways. For example, a sulfur-alkali metal sulfide mixture can be emplaced as a layer of powder on the fibers between the spacer tape and potting material before or as the assembly is being rolled up. This, of course, must be done under an inert atmosphere. Also, the amount of cathode material must be such as to leave room for an increase in catholyte volume being discharge of the cell.

Preferably, the cathodic current collector-distributor, i.e., the conductive sheet or foil, is perforated (15; FIG. II) in at least an area adjacent to the inner edge of the skirt (16) on which the spacer tape will be placed and the catholyte is introduced as a melt after the cell is assembled.

Cathode material is best introduced by evacuating the cathode chamber and infusing the molten catholyte under pressure of an inert gas into the evacuated chamber through the perforations in the foil and into the spaces between the fibers. To accomplish evacuation and insertion of cathode material, the cathode chamber is fitted with a port (not illustrated) preferably located proximately to the tube sheet. After insertion of the cathode material, the port is sealed to provide cells such as those depicted in the drawing. Where the cathode material is sulfur or sulfur admixed with a minor amount of sodium sulfide, insertion is accomplished by maintaining the material at a temperature of from about 120° C. to about 150° C., and introducing the material as described above. An especially convenient cathode casing is one constructed of aluminum or magnesium-aluminum alloy and fitted with a short, open nipple. After insertion of the cathode material through the nipple, the nipple is sealed by a weld bead or other means to maintain the material in the cathode chamber.

After the sheet fiber assembly has been fitted with container means, anode material is introduced into the fibers and into the reservoir for anode material above the tube sheet. This is accomplished most conveniently by placing solid anode material in the reservoir, evacuating the reservoir and fibers, melting the anode material so that it flows over and submerges the open ends of the fibers, and applying pressure to the molten cathode material to introduce a portion thereof into the fibers. The pressure is applied, for example, by introducing an inert gas pressure (e.g., argon) into the reservoir container over the molten anode material.

Suitable potting compositions include organosiliconate cements, such as are described in application Ser. No. 70,532, now abandoned filed Sept. 8, 1970 in the name of F. Y. Tsang, entitled CERAMABLE ORGANOSILICATE CEMENTS, and now abandoned. Suitable glass compositions for the hollow fiber electrolyte-membrane include borate-silicate compositions such as are described in co-pending application, Ser. No. 78,201 now abandoned, filed Oct. 5, 1970 in the names of H. M. Garfinkel and C. A. Levine, entitled GLASS MEMBRANE FOR ALKALI METAL-SULFUR BATTERY.

Suitable adhesives for bonding the container members 2 and 3 to the tube sheet include resins located with finely ground particulate filter materials. For example, a suitable adhesive consists of a cross-linked polysiloxane resin loaded with finely ground (less than 200 mesh, U. S. Std. Sieve) aluminum, zircon ($ZrO_2$), glass, sand, magnesium oxide or talc. Boric oxide particles can also be employed. The siloxane-type of adhesive is generally employed with a small amount of strongly basic catalyst such as diethylene triamine or 2-ethylhexyl trimethyl ammonium hexanoate. Typically, the siloxane is a methyl-phenyl siliconate block copolymer. Adhesives comprising such resins are cured by heating at temperatures of about 300° C.

Example

An elongated rectangular sheet of ½ mil thick, 5005 commercial aluminum foil, 4 inches wide, is laid flat. Hollow glass tubules, 4 mils O. D. and 4 inches long, are spaced apart at 4 mil intervals in a generally parallel array transversely to the long axis of the foil. They are positioned on the foil so that their open ends extend three-eighths inch beyond one edge of the foil and the other edge of the foil extends three-eighths inch beyond their closed ends. A spacer tape of the same 5005 alloy, 4 mils thick and slightly less than three-eighths inch wide, is positioned on the portion of the foil extending beyond the closed fiber ends. A terminal portion of the foil, left uncovered with fibers for a distance of about 2 inches, is used as a starting tab and the foil, fiber array and spacer tape are rolled up on a ¼ inch diameter × 5 inch rod of 5005 aluminum alloy. Sufficient tension is exerted on the spacer tape and foil during winding to ensure good contact between them. The length of the spacer tape is such that an and about 12 inches long extends out of the wound up "jelly-roll" as a finishing tab. This end is wrapped tightly around the rest of the assembly and then encircled with a screw-tightened hose clamp. The resulting cylinder is about three inches in diameter. A weld bead is formed on the bottom surface of the cylinder by fusing adjacent foil and spacer tape wraps together with an electric arc under helium. This is done with a Linde 300 amp electric welder using a direct current, straight polarity mode with high frequency interruption and helium gas shielding. An air-cooled torch with a 1/16 inch tungsten tip is positioned near the edge of the cylinder and an arc is struck (soft start switch not on). A current of from 140–170 amperes is drawn as the torch tip is moved in a radial traverse until the arc reaches the portion of the aluminum rod projecting axially from the cylinder. The arc is then restruck on the opposite edge of the cylinder and traversed radially to the rod again. The resulting weld bead is continuous along a diameter of the cylinder and with the rod end. It is bright and essentially flush with the cylinder surface.

We claim:

1. A method of making a coiled sheet electrode for a battery cell, comprising
   a. disposing a narrow metallic spacer strip along one longitudinal edge of and upon a surface of an elongate metallic foil,
   b. rolling up the strip and foil together to form a generally cylindrical coil having a generally planar end surface consisting of the adjacent edges of the strip and foil,
   c. radially compressing the foil and strip together in the coil and
   d. forming a weld bead on said end surface by heli-arc welding.

2. The method of claim 1 in which a plurality of hollow fibers, each having a closed end and an open end and having a diameter not more than twice the thickness of the spacer strip, are so disposed on the foil surface that they will be generally parallel to the coil axis and between those portions of the foil wraps not in contact with the spacing strip, said fibers having their closed ends adjacent the inner edge of said strip, having their open ends projecting uniformly beyond a second longitudinal edge of the foil and being composed of a material suitable for use as an electrolyte-membrane in an alkali metal-sulfur battery cell.

3. The method of claim 2 in which the fibers are closely spaced, a curable paste or slurry is deposited on the projecting end portions of the fibers and a tube sheet is formed by curing the continuous body of paste or slurry which results when the fibers, foil and strip are rolled up together.

4. The method of claim 1 in which the coil is formed around a mandrel.

5. The method of claim 4 in which the mandrel has an electroconductive end which projects out of said end surface of the coil and said weld bead is joined in electroconductive contact with said mandrel end.

6. A coiled sheet electrode made by the method of claim 1.

7. An alkali metal-sulfur battery component made by the method of claim 2.

8. An improved alkali metal-sulfur battery cell comprising the component of claim 7.

9. An improved alkali metal-sulfur battery comprising a component made by the method of claim 5.

* * * * *